United States Patent [19]

Wojnarski

[11] Patent Number: 5,481,071
[45] Date of Patent: Jan. 2, 1996

[54] ELECTRONIC BALANCE WITH A KEY FOR ENABLING A SPECIFIC FUNCTION

[75] Inventor: Tadeusz Wojnarski, Wallisellen, Switzerland

[73] Assignee: Mettler-Toledo AG, Greifensee, Switzerland

[21] Appl. No.: 119,965

[22] Filed: Sep. 10, 1993

[30] Foreign Application Priority Data

Sep. 29, 1992 [CH] Switzerland .......................... 3036/92

[51] Int. Cl.⁶ .......................... G01G 23/02; H01H 27/00
[52] U.S. Cl. .......................... 177/124; 177/238; 73/1 B; 200/43.07
[58] Field of Search .......................... 177/1, 180, 181, 177/124, 50, 238; 73/1 B; 200/43.04, 43.07

[56] References Cited

U.S. PATENT DOCUMENTS

| | | | |
|---|---|---|---|
| 509,591 | 11/1893 | Braley | 177/124 |
| 3,370,137 | 2/1968 | O'Connor | 200/43.04 |
| 4,454,392 | 6/1984 | Rapp et al. | 200/43.07 X |
| 4,586,575 | 5/1986 | Müerdter et al. | 177/124 |
| 5,086,879 | 2/1992 | Latimer et al. | 177/50 X |

Primary Examiner—Peter S. Wong
Assistant Examiner—Randy W. Gibson
Attorney, Agent, or Firm—Friedrich Kueffner

[57] ABSTRACT

An electronic balance includes a switch mounted on a print in the interior of the balance housing for switching on and off a function which is usually locked, for example, the function "calibrating". The switch is actuated by a prong which is mounted on a closing member and is insertable through an opening in the side wall of the balance housing. A guide member guides the prong along an inclined surface for facilitating the pressing down of the switch button. In the normal condition of operation of the balance, the closing member is turned by 180° and reinserted through the opening, such that the prong projects laterally past the switch in the housing. This configuration prevents incorrect manipulations or damage to the print in the housing because it does not require the insertion of a screwdriver or similar tool for actuating the switch.

9 Claims, 2 Drawing Sheets

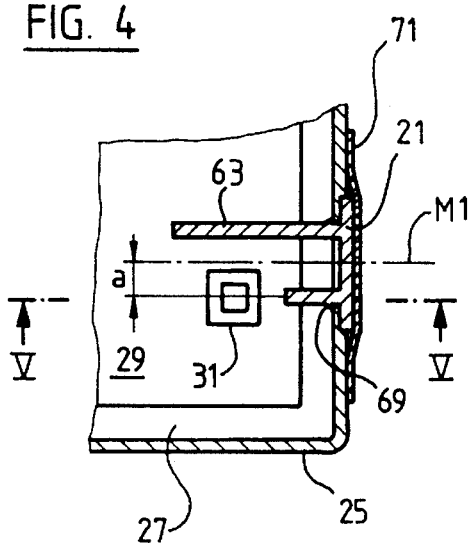
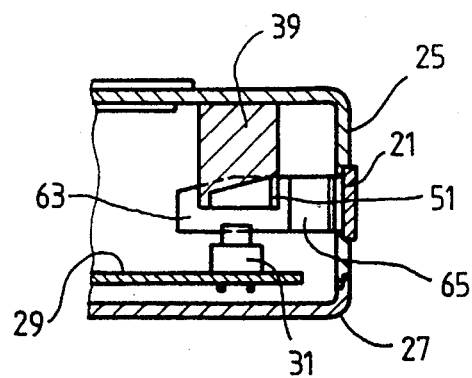
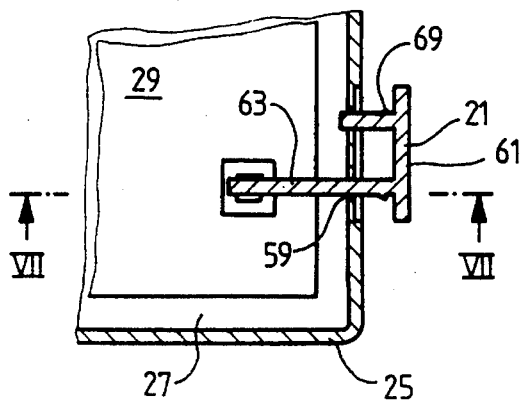
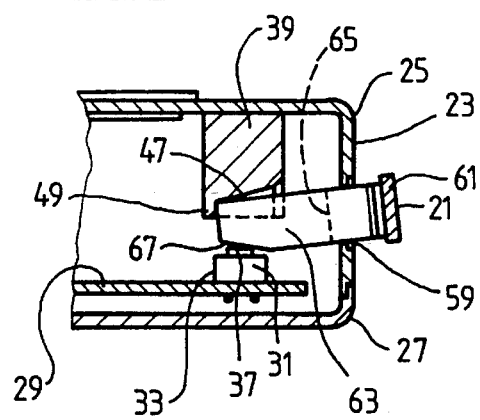
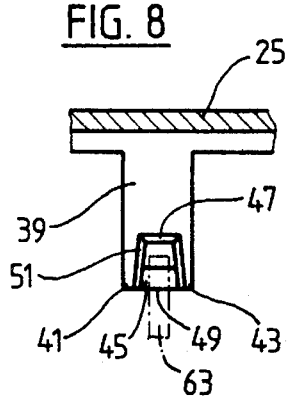
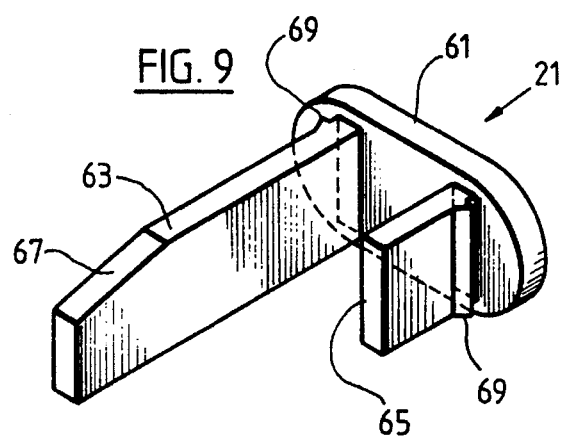

ELECTRONIC BALANCE WITH A KEY FOR ENABLING A SPECIFIC FUNCTION

BACKGROUND OF THE INVENTION

1. Field of the Invention

The present invention relates to an electronic balance having at least one function which can be additionally switched on and which is secured against unauthorized switching on by a locking means arranged in the balance housing. The balance housing has an opening for inserting a member for the actuation of the locking means.

2. Description of the Related Art

Modern electronic balances may have a plurality of functions, wherein some of these functions serve for the adjustment of the balance, for example, for the calibration of the balance. It should be possible to make some of these functions, such as the calibration of the balance, inaccessible to unauthorized operating personnel, wherein these functions should be for legal reasons only accessible to authorized persons, such as an official of a bureau of weights and measures.

In some known electronic balances, the function which is usually locked, for example, the calibration function, is activated after opening the housing balance by changing the position in which a jumper is arranged on the balance print. This rearrangement of the jumper insure that the desired functions are locked because the housing is usually secured by a seal or another means which indicates that the housing has been opened. In balances which include a draft protection device, the structures which form the draft protection device must be disassembled for carrying out a calibration and subsequently the balance housing whose upper portion is screwed to the bottom must be opened. After the calibration has been carried out, the previously disassembled parts must again be joined together and, if it is found that the calibration was not carried out with the desired result, the balance housing and any draft protection device placed on the balance housing must again be disassembled. This is cumbersome and each opening of the balance may lead to problems which can only be eliminated by trained maintenance personnel of the balance manufacturer.

In other known balances, the balance housing has an opening and the balance includes a switch arranged behind the opening. For actuating the switch, a tool, for example, a screwdriver, must be inserted through the opening into the interior of the balance. During this procedure, the inserted screwdriver may damage parts of the balance, particularly electronic components on the print. The actuation of the switch by means of the screwdriver requires precise knowledge of the balance, i.e., location of the switch behind the opening, on the one hand, and significant dexterity in finding the switch without contacting elements of the balance next to or behind the switch, on the other hand.

SUMMARY OF THE INVENTION

Therefore, it is the primary object of the present invention to provide an electronic balance in which at least one function which is locked during normal operation can be temporarily switched on without the use of tools.

In accordance with the present invention, the locking means is a switch for switching on the function which is locked during normal operation. The housing opening can be closed by means of at least one closing member. An actuating member for actuating the switch is arranged on the inner side of the closing member.

The configuration of the closing member according to the present invention with the actuating member fastened to the inner side of the closing member makes it possible to actuate the switch arranged in the interior of the balance housing and, thus, to release or lock the corresponding function, without any danger of damaging other elements of the balance.

In accordance with a feature of the present invention, the switch is arranged offset relative to the closing member, so that the closing member, after turning it by 180°, can be inserted in the housing without actuating the switch.

By providing a contact surface at the end of the actuating member and/or on the switch which is inclined relative to the longitudinal axis of the actuating member or the switch, the switch can be actuated or switched with little resistance encountered by the actuating member when it is inserted into the housing opening.

In accordance with a further development of the present invention, the switching path can be increased by providing at the upper side of the housing a guide track which extends inclined relative to the horizontal for the switching member.

In accordance with a particularly advantageous feature, a stop is arranged at the end of the inclined guide track which is intended to come into contact with the actuating member before the closing member rests against the outer side of the housing. This makes it possible to determine at all times whether the closing member has been inserted in the housing for releasing a function which is normally locked. The inclination of the guide track is selected in such a way that the actuating member is automatically pushed out of the housing by a restoring spring in the switch when the closing member is released. Accordingly, it is ensured that the closing member with the actuating member does not unintentionally remain inserted in the housing and permanently releases the normally locked function. The inclined guide track on the upper part of the housing can be arranged in a groove-like recess, so that the guidance of the actuating member is further improved.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described a preferred embodiment of the invention.

BRIEF DESCRIPTION OF THE DRAWINGS

In the drawing:

FIG. 4 is a partial horizontal sectional view of the balance housing showing the portion with the opening for the closing member, with inserted closing member;

FIG. 5 is a cross-sectional view taken along sectional line V—V of FIG. 4;

FIG. 6 is a partial horizontal sectional view of the balance housing showing the portion with the opening for the closing member, with the closing member being turned for switching on the switch;

FIG. 7 is a cross-sectional view of the housing taken along sectional line VII—VII of FIG. 6;

FIG. 8 is a front view of the guide member; and

FIG. 9 is a perspective view, on a larger scale, of the closing member.

DESCRIPTION OF THE PREFERRED EMBODIMENT

Figure 1:
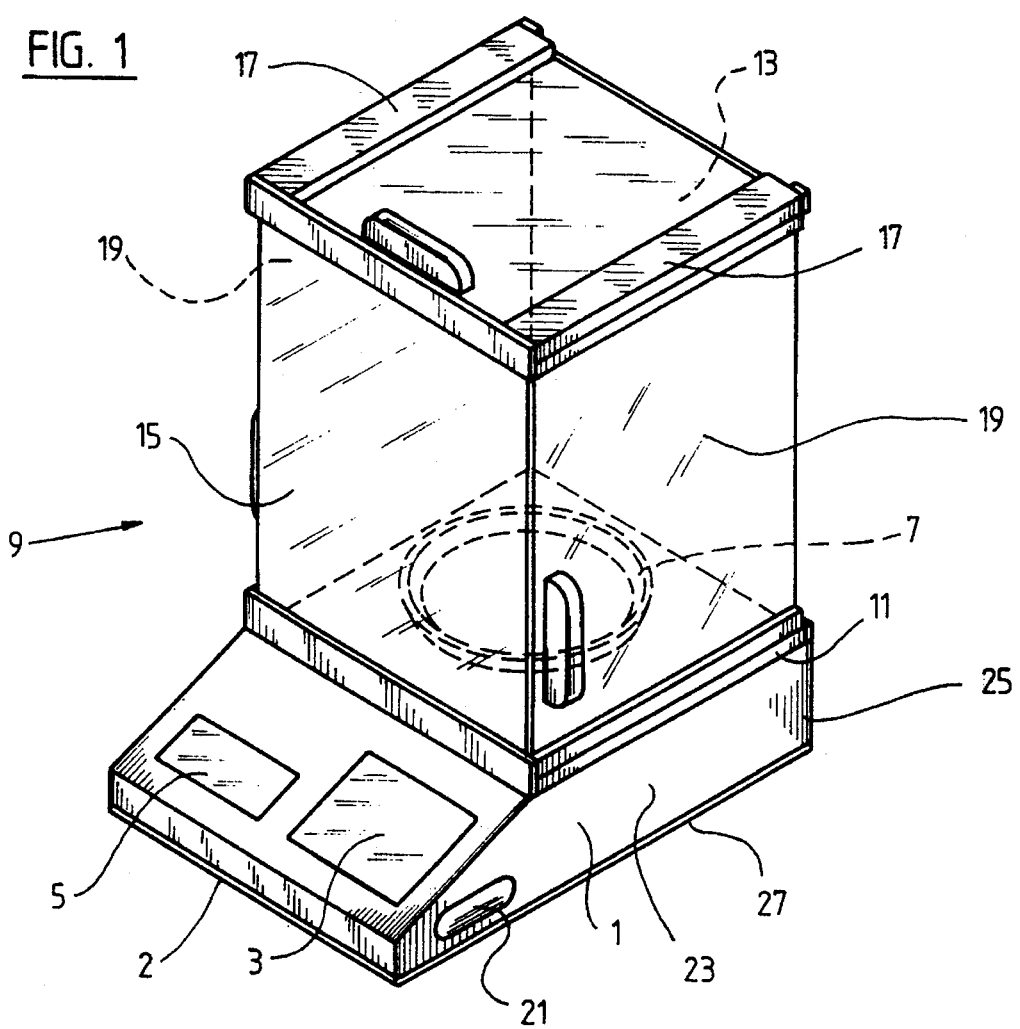
FIG. 1 is a perspective view of an electronic balance according to the present invention.

FIG. 1 of the drawing shows an electronic balance 1 according to the present invention. The balance 1 includes a balance housing 2 with an indicator field 3 and a keyboard field 5 as well as a weighing dish 7. A cubic draft protection device 9 is placed on the balance housing 2. The wind protection device 9 essentially consists of a base 11, a rear wall 13 fixedly connected to the base 11, a front glass 15 which connects the base 11 with two struts 17 which extend forwardly from the rear wall 13, as well as two sliding doors 19 for closing the sides of the draft protection device 9.

A closing member 21 inserted in the housing wall 23 can be seen next to the indicator field 3. The housing wall 23 forms part of the upper part 25 of the housing which is placed on a lower part 27 of the housing and carries the mechanical and electronic components of the balance.

Figure 2:
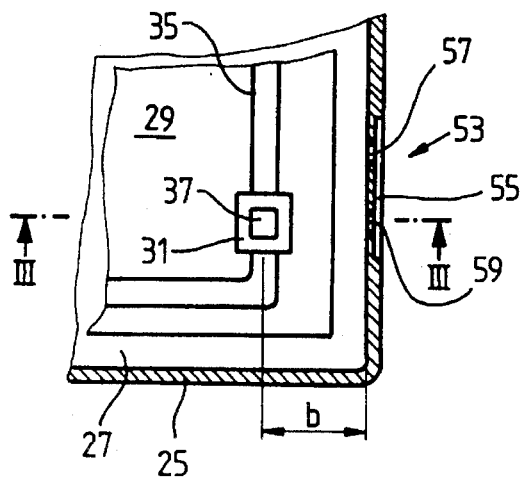
FIG. 2 is a partial horizontal sectional view of the balance housing showing the portion with the opening for the closing member, without inserted closing member.

The cross-sectional views of FIGS. 2 to 7 show the right front corner portion of the upper part 25 of the housing and of the lower part 27 of the housing. A print 29 which carries a portion of the electronic elements of the balance 1 is mounted on the lower part 27 of the housing and at a vertical distance from the lower part 27. With the exception of a switch 31 for switching on the function "calibrating", the drawing does not show any electronic elements of the balance. The switch 31 is placed with its switch housing 33 directly on the print 29 and is electrically connected to conductors 35 which are shown in FIG. 2. A switch button 37 projects above the switch housing 33. The switch button 37 is vertically displaceable and pre-tensioned by means of a spring.

Figure 3:
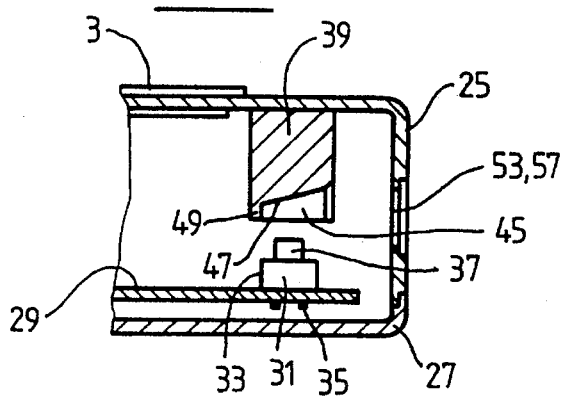
FIG. 3 is a sectional view taken along sectional line III—III of FIG. 2.

As shown in FIG. 3, a guide member 39 is arranged on the upper part 25 of the housing above the switch 31. The guide member 39 may be part of the upper part 25 of the housing or may be attached to the upper part 25. As illustrated in Fig. 8, the guide member 39 has a groove 45 defined by two side walls 41 and 43. The bottom or base 47 of the groove 45 is at least partially inclined relative to the horizontal, as can be seen in FIG. 3. A wall 49 forms the rearward end of the groove 45. At the open end of the groove 45, the side walls may have conically converging portions 51, as can also be seen in FIG. 8.

The housing wall 23 has an opening 53 for receiving the closing member 21. In the illustrated embodiment, the opening 53 is composed of an oblong recess 55 in the housing wall 23 and two holes 57 and 59 extending through the housing wall 23 and located within the recess 55. The holes 57, 59 are located at a distance a from a centerline $M_1$ which extends through the middle of the housing opening 53. The contour of the closing member 21 preferably corresponds to the contour of the oblong recess 55. Of course, the oblong recess 55 can also be omitted and the closing member 21 may directly contact the surface of the housing wall 23.

The hole 59 which is closer to the front side of the balance 1 is located directly in front of the switch 31 and at a distance b from the switch button 37, as shown in FIG. 2.

The closing member 21, shown in a perspective view in FIG. 9, is composed of a base plate 61 and two prongs 63 and 65 of unequal length attached to the base plate 61. The long prong 63 may have at its front end a surface 67 which is inclined relative to the longitudinal axis of the prong 63. Locking cams 69 are integrally formed on the short prong 65 and the long prong 63. The locking cams 69 engage with the inner side of the housing wall 23 after the closing member 21 has been fully inserted in the recess 55, as shown in FIG. 4 of the drawing.

The long prong 63 has a width which is slightly smaller than the width of the groove 45 in the guide member 39.

During the use of the balance 1, i.e., during the normal condition, the closing member 21 is inserted completely into the recess 55 in the position shown in FIG. 4. The long prong 63 projects laterally past the switch 35 into the interior of the balance housing 2. The short prong 65 projects past the wall of the upper housing part 23 only to a small extent and the two locking cams 69 on the prongs 63 and 65 secure the closing member 21 in the housing. In order to prevent unauthorized opening or removal of the closing member 21, the closing member 21 may be secured, for example, by means of a calibration sticker 71.

In order to switch on the function code "calibration" by an authorized person, for example, an official of a bureau of weights and measures, the sticker 71 is removed and the closing member 21 is pulled out of the opening 53, is turned by 180° and is again inserted into the balance housing 2 with the long prong 63 in the hole 59. As the long prong 63 is inserted, the front end thereof, which is guided by the groove 45 in the guide member 39, is gradually swung downwardly because the front end slides downwardly along the inclined portion of the bottom 47. The inclined surface 67 of the prong 63 makes contact with the switch button 37 and presses the latter into the switch housing 33, as illustrated in FIGS. 6 and 7 of the drawing. The switch 31 thus releases the function "calibrating".

The wall 49 which forms the axial end of the groove 45 prevents the closing member 21 from being completely pushed into the opening 53 of the housing wall 23. As a result, it is always clearly visible if the closing member 21 is in the "switching position" and, thus, releases functions in the balance 1 which are otherwise locked. The inclined surface on the bottom 47 of the groove 45 causes the closing member 21 to slide out of the housing 21 when the closing member 21 is released. Consequently, an unintentional permanent actuation of the switch 31 is immediately excluded when pressure is no longer applied on the closing member After the calibration procedure has been carried out, the closing member 21 is again pulled out of the opening 53, is turned by 180° and is reinserted and locked in the opening 53. This is carried out without opening the balance housing 2 at all and without disassembling any other balance components. The closing member 21 can then be secured again on the housing 2 by means of a new calibration sticker 71.

Of course, it is possible that the closing member 21 is reinserted into the housing after being turned into the "normal position" immediately after the switch 31 has been actuated. The period of time during which the closing member 21 must be inserted for actuating the switch 31 only depends on whether the electronics of the balance maintains the function "calibrating" for a certain time after the switch 31 has been actuated once, or whether the switch 31 must be continuously actuated during the calibration.

In accordance with an alternative solution, it is of course also possible that the switch 31 is arranged in the axis of the long prong 63 or the opening 59, so that, when the closing member 21 is inserted, the switch 31 is actuated directly with the end face of the long prong 63.

In the embodiment of the invention described above and illustrated in the drawing, only one function of the balance is lockable and switchable. However, the present invention is also directed to those embodiments in which several functions must be switchable only by authorized persons. In these cases, either several switches are provided which are actuated by means of a closing member having several actuating members, or several closing members with one actuating member each are provided.

Other variations of the closing member are possible within the scope of the present invention. For example, the closing member may be round with an eccentrically arranged switching prong (the second prong can be omitted), wherein the switch is actuated by rotating the closing member.

Of course, although the present invention has been described in connection with a balance having a draft protection device, the present invention is not limited to such balances.

The invention is not limited by the embodiments described above which are presented as examples only but can be modified in various ways within the scope of protection defined by the appended patent claims.

I claim:

1. An electronic balance comprising a balance housing, a locking means for securing at least one balance function against unauthorized actuation, the locking means comprising a switch for switching on and off the balance function, the balance housing having an opening for inserting into the balance housing at least one closing means for closing the balance housing, the closing means having an inner side, and an actuating member for actuating the switch being mounted on the inner side of the closing means.

2. The electronic balance according to claim 1, wherein the opening has a center axis, the balance housing having a side wall, the opening being formed in the side wall, and wherein the switch is arranged laterally offset and at a predetermined distance from the center axis of the opening and at a predetermined distance from the side wall.

3. The electronic balance according to claim 2, wherein the closing means has a middle, the actuating member being arranged at a predetermined distance from the middle of the closing means, wherein the predetermined distance between the actuating member and the middle of the closing means corresponds to the predetermined distance between the switch and the center axis of the opening.

4. The electronic balance according to claim 1, wherein the actuating member comprises a prong having an end, the end of the prong defining an inclined surface.

5. The electronic balance according to claim 4, wherein the balance housing comprises an upper part, a guide member being mounted on the upper part of the balance housing above the switch, the guide member having a surface which is inclined relative to the horizontal.

6. The electronic balance according to claim 5, wherein the balance housing has a center, the guide member having at an end facing the center of the balance housing a wall extending vertically downwardly from the inclined surface of the guide member, the housing having a side wall, the prong forming the actuating member having a length, the vertically downwardly extending wall being spaced from the side wall at a distance which is smaller than the length of the prong.

7. The electronic balance according to claim 6, wherein the inclined surface of the guide member is located within a groove having a width, the actuating member having a width which corresponds to the width of the groove.

8. The electronic balance according to claim 7, wherein the groove has conically extending portions at an end facing the side wall of the balance housing.

9. The electronic balance according to claim 1, wherein the opening in the balance housing includes two holes, the closing means further comprising a positioning prong mounted spaced from the actuating member, the actuating member and the positioning prong being insertable in the two holes.

* * * * *